United States Patent Office 3,314,797
Patented Apr. 18, 1967

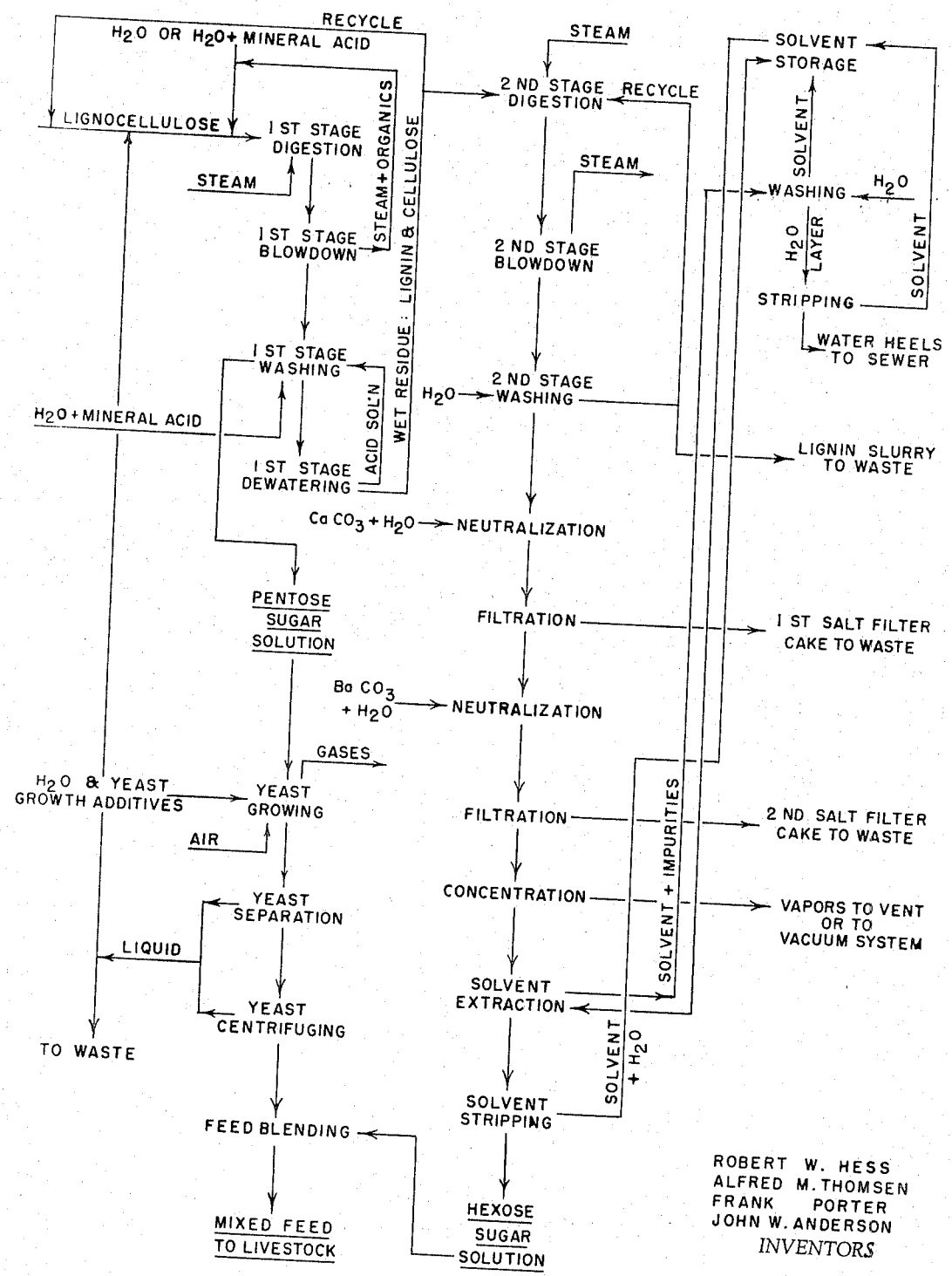

3,314,797
CONVERTING LIGNOCELLULOSE MATERIALS INTO YEAST CONTAINING STOCK FEED
Robert W. Hess, Beaverton, Oreg., Alfred M. Thomsen, San Francisco, Calif., Frank Porter, Morristown, N.J., and John W. Anderson, Portland, Oreg., assignors of one-half to Georgia-Pacific Corporation, Portland, Oreg., a corporation of Georgia, and one-half to Allied Chemical Corporation, New York, N.Y., a corporation of New York
Filed Apr. 12, 1963, Ser. No. 272,698
18 Claims. (Cl. 99—9)

This invention relates to a process for the conversion of lignocellulose materials into feed for livestock.

Much work has been done heretofore on procedures for making livestock feed from wood and other lignocellulose materials by hydrolyzing the materials in aqueous acid medium, converting the cellulose content of the materials to sugars. A proportion of the sugars then is used as a yeast growing medium, thereby converting it to yeast. In this way both the protein and carbohydrate components of a stock feed may be produced.

The prior art procedures have not been successfully commercially, however, for several reasons.

First, they have not been economically attractive. Predominant among the reasons for this has been the usual provision for drying the yeast for storage and shipment. Yeast is difficult to dry, and this provision has added materially to the potential cost of the procedures, making the product non-competitive with soya protein, which is abundant and of relatively low cost.

Secondly, the acid hydrolysis of the lignicellulose material results in the production of a substantial proportion of pentose sugars derived from the hemicellulose content of the material. Such sugars have a strong laxative effect on livestock and make the feed undesirable.

Third, the acid hydrolysis of the lignocellulose materials necessarily results in the degradation of a certain proportion of the lignocellulose to form undesirable impurities. These include formic, acetic and other volatile organic acids; furfural and other aldehydes; and levulinic acid. When a feed containing such impurities is fed to livestock, it affects adversely the metabolism of the animals, resulting in loss of appetite. It also may prove unpalatable to the animals, resulting in rejection of the feed ration. Still further, if the hydrolysis product is used as a yeast growth medium, the impurities inhibit the growth of the yeast cells.

Accordingly, it is the general object of the present invention to provide an integrated process for the conversion of wood and other lignocellulose materials into livestock feed containing calculated proportions of carbohydrate and protein and thus constituting substantially the entire ration which needs to be fed to livestock in order to secure its satisfactory growth and development.

Another object of the invention is to provide such a process for the conversion of lignocellulose materials into stock feed which process is accompanied by the production of high yields of both carbohydrate and protein feed components and which results in the production of such components relatively free from unwanted and undesirable lignocellulose degradation products.

The hereindescribed process of converting lignocellulose materials into stock feed broadly comprises preferentially hydrolyzing the hemicellulose content of the material in aqueous acid medium, thereby forming an aqueous pentose-containing liquor and a solid cellulose- and lignin-containing residue. The liquor is separated from the residue after which the residue is treated in aqueous acid medium for the preferential hydrolysis of its cellulose content. This forms an aqueous hexose-containing liquor and a solid lignin-containing residue.

The latter two products are separated from each other, thereby providing a hexose sugar-containing liquor which, after concentration and purification, serves as the carbohydrate component of the stock feed.

The pentose-containing liquor also may be purified for removal of the hydrolytic lignocellulose degradation products after which it is fortified with yeast growth additives and inoculated with the selected yeast strain.

The resulting fermentation converts the sugar content of the liquor, which is entirely suitable as a yeast growth medium, to a yeast product. This provides the protein component of the stock feed.

The carbohydrate component, i.e. the concentrated hexose sugar liquor, and the protein component, i.e. the concentrated yeast product, then are blended together in the predetermined proportions to form a fluid, pumpable feed which is appropriate for immediate feeding to the stock with or without the blending in of various trace minerals. There thus is provided a feed derived from lignocellulose materials which can serve as a complete diet for the livestock, which is palatable to the livestock, and which may be eaten by the livestock without metabolic disturbances.

Considering the foregoing in greater detail and with particular reference to the single figure of the drawing, consisting of a flow plan of a preferred procedure for the execution of the hereindescribed process:

The lignocellulose materials which may be employed in the selective hydrolysis of the present invention broadly comprise those classes of lignocellulose materials which stem from plant growth processes and are readily available as waste by-products of various industries. Thus they may comprise such plant-derived materials as oat hulls, corn stalks and bagasse. In particular, however, they comprise the woods of various species of trees.

The lignocellulose material requires no special treatment preliminary to its use, although it should be reduced to a finely divided state if it already is not present in that condition. Thus wood may be employed to advantage in the form of sawdust, wood shavings, thin chips, flakes, and the like.

(A) FIRST STAGE HYDROLYSIS

As indicated above, in the first stage of the procedure the lignocellulose material is heated with a first aqueous liquor of such a nature, and under such conditions, as to hydrolyze selectively the hemicellulose content of the lignocellulose, forming a sugar product containing both pentose and hexose sugars.

In the execution of the first stage treatment it is not necessary to pretreat the lignocellulose material, as by adjusting its moisture content, or pre-soaking it with preliminary reagents. However, it is very desirable to permit the lignocellulose intimately with the selected aqueous liquor before subjecting the mixture to elevated temperatures and pressures. This is especially desirable since in the first stage the liquor to solids ratio is maintained at a relatively low level.

Accordingly, the lignocellulose material and treating liquor are premixed in a suitable apparatus such as a double ribbon blender, a pug mill, a rotary drum mixer, or like apparatus. The mixing is continued until the treating liquor has been distributed uniformly throughout the charge, thereby avoiding both starved regions and regions where there is a surplus of treating agent.

This, in turn, insures that during the hydrolytic treatment there will not be areas where some of the lignocellulose material is not acted upon, nor will there be areas wherein a surplus of treating agent induces undesired conversion of the cellulose, and degradation of the lignin. It has been found, in fact, that, by premixing thoroughly, a uniformity of reaction occurs throughout the entire reaction mixture which results in improving the conversion of hemicellulose to sugars.

The amount and character of treating agent to be premixed with the lignocellulosic material is such as to be consonant with the primary objective of the process, i.e. that of selectively converting in the first stage treatment the hemicellulose to pentoses and other derivative sugars. Hence the concentration of mineral acid included in the treating agent is kept at a very low level, not over 0.3% by weight. Indeed, it usually is preferred to carry out the treatment in the substantial absence of added mineral acid, relying upon the inherently acid pH of the lignocellulosic reaction mixture to break down the hemicellulose in the desired manner.

Likewise, the liquor to solids charging ratio is maintained at a very low level, i.e. a level of from 1:1–5:1, preferably from 1:1–3:1. In the conventional wood hydrolysis procedures, a liquor to solids ratio of the order of 6:1 has been employed.

Various factors may be controlled in order to arrive at the desired liquor to solids weight ratio. This is possible since the water component of the liquor is derived in part from each of three sources.

First, the inherent moisture content of the lignocellulosic material contributes a certain proportion of water. Next the water added in the premix stage contributes a further proportion. Finally, where the reaction mixture is heated by direct steam injection, the condensed steam contributes a still further proportion. Hence control of the amount of water furnished by each of these three sources makes it possible to regulate accurately the final liquor to solids ratio of the mixture.

In the preferred practice of the invention, the amount of water used in premixing may be relatively small, for example, sufficient only to provide a liquid to solids charging ratio of 1.5:1. However, sufficient water then is added during heating by steam injection to increase the amount of water present until a final liquid-solid ratio of from 4–5:1 is attained.

Where a mineral acid is included in the aqueous treating liquor, it may comprise any of the common mineral acids which do not react with lignocellulosic materials to cause the occurrence of undesirable side reactions. Illustrative of suitable acids are hydrochloric acid, phosphoric acid and, particularly, sulfuric acid. Acid-acting salts such as monosodium phosphate and sodium acid sulfate also may be used to provide all or part of the acid content of the liquor.

The premixed lignocellulose and aqueous liquor are introduced into a suitable pressure vessel. This may be either a continuous or batch pressure reactor provided with means for heating the charge to the predetermined temperature at the predetermined pressure. As stated before, this may be accomplished by direct steam injection.

Within the reactor the pressure upon the charge is increased as rapidly as possible to a value of from 100–700 p.s.i.g., preferably from 250–600 p.s.i.g., the temperature being increased contemporaneously to the corresponding levels for saturated steam. These conditions are maintained for a relatively brief period of time, sufficient only to convert substantially selectively the hemicellulose content of the lignocellulose to pentose and other derivative sugars. In the average case this requires but from 0.3–10 minutes, the time being in substantially inverse relation to the temperature applied. That is, the higher the temperature, the shorter the time, and vice versa.

As a result, there is formed a first liquor product containing pentose and hexose sugars together with a small amount of volatile organic acids such as acetic acid, as well as the residual mineral acid if a mineral acid is included in the first instance. There also is formed a first solid residue containing predominantly unhydrolyzed lignin and unhydrolyzed cellulose.

The pressure next is reduced preliminary to separation of the liquor and solid residue products. Whereas the time required for pressure reduction by prior art procedures has been very long, i.e. of the order of several hours, it is important for the success of the presently described process that it be kept at a very low value. Thus there is a substantially instantaneous reduction of pressure resulting in what is termed herein a "flash blowdown." Where a continuous reactor is employed, the blowdown time is but a few seconds. Where a large batch reactor is used, the blowdown time is but a few minutes.

Such a rapid reduction in pressure has several significant effects.

First, it rapidly stops the hydrolytic reaction. This in turn minimizes the production of hexose sugars from degradation of the cellulose. It also minimizes production of lignin degradation products and prevents the decomposition of the desired sugar products.

Secondly, the flash blowdown evaporates some of the water which is present. The resultant steam then may be employed to advantage in a heat exchange with the material charged to the reactor.

Third, the flash blowdown flashes off acetic acid, formic acid, or other organic volatiles which may have been formed as by-products of the reaction. There thus is provided a built in operation for separating and removing impurities from the reaction products.

Fourth, the flash blowdown explodes the particles of the solid residue. This makes them porous, opening them up for more efficient treatment in the second hydrolytic stage.

The flash blowdown may be carried out in any suitable apparatus. In a continuous process, it may be carried out to advantage by continuously passing the charge from the reactor into a cyclone separator specially designed to handle large volumes of material and resistant to corrosion and abrasion.

As is indicated in the flow plan, the volatile fraction resulting from the blowdown step, comprising steam and volatile organics, may be exhausted through a suitable heat exchange system. In the alternative, it may be condensed, and recycled to the treatment of an additional quantity of lignocellulose with or without the preliminary separation of its organic content.

The residue remaining from the blowdown contains water-insoluble lignin, and cellulose. In addition, it contains water-soluble pentose and hexose sugars which it is desirable to remove.

Accordingly the residue is passed through a suitable separator and treated with a selected liquid. This advantageously may be an aqueous solution of mineral acid, for example, a 0.5% solution of sulfuric acid. The separation is carried out preferably by continuous displacement washing of countercurrent streams in a tower. In the tower, the solids settle downwardly, becoming saturated with acid, while the liquor rises upwardly, displacing the sugar solution. The latter is withdrawn by the application of this technique in a relatively high concentration of the order of 5–12% by weight.

The pentose sugar liquid thus obtained is not well suited for direct feeding to livestock because of its strong laxative effect. However, it is a highly suitable yeast growing medium and accordingly is applied to this purpose as will be described in detail hereinafter.

(B) SECOND STAGE HYDROLYSIS

The solid residue resulting from the first stage hydrolytic treatment then is processed for the conversion of its cellulose content to hexose sugars. Hence it is returned to the same or a separate reactor, adding more mineral acid if that remaining in it from the above described washing procedure is not sufficient for the second stage treatment.

The reaction conditions in the second stage reactor are more strenuous than those prevailing in the first stage reactor. They have as their object the conversion of the cellulose to hexose sugars without inducing undue degradation of the lignin.

Accordingly the liquor to solids ratio is maintained within the broad range of from 1:1–5:1, preferably from 1:1–3:1. The mineral acid concentration of the liquor treating agent is maintained at a level of from 0.3–3.0% by weight.

The reactor is heated indirectly, or preferably by the direct injection of steam, until a pressure of 150 to 900 p.s.i.g., preferably from 400–800 p.s.i.g. and corresponding temperatures for saturated steam, are reached.

The reactor is maintained under the foregoing conditions for a time which is in substantially inverse relation to the temperature, i.e. the higher the temperature the shorter the time and vice versa. During this time, which is within the range of from 0.3 to 10 minutes, the cellulose content of the charge is converted substantially selectively to hexose sugars, leaving a solid residue containing predominantly unhydrolyzed lignin.

As in the first stage, it is highly desirable to terminate the reaction abruptly in order to minimize production of undesired degradation products, in order to evaporate excess water, in order to flash off any organic volatiles which may be present, and in order to modify the lignin residue so that it may be filtered and handled more easily.

For these reasons the charge of the reactor is subjected to a flash blowdown, as by passing it continuously to a blowdown cyclone apparatus. This reduces the pressure to atmospheric pressure in a matter of but a few seconds.

The steam from the blowdown apparatus is vented while the solid product is washed with water in a second stage extractor. The operation of this extractor results in separating the hexose sugar liquor from the cellulose-containing lignin residue, which is passed to waste or recycled.

(C) SOLVENT EXTRACTION

As has been pointed out above, the hexose sugar liquor, as well as the pentose sugar liquor resulting from the first stage of the procedure, are contaminated with variable but appreciable quantities of undesirable by-products resulting from the degradation of the lignocellulose. It may be desirable to remove these impurities from the pentose sugar liquor preliminary to inoculating it with yeast, since the impurities inhibit the growth of the yeast cells. It is highly desirable to remove these impurities from the hexose sugar liquor preliminary to feeding it to stock since the impurities, if eaten, make the stock ill and also render the feed unpalatable.

As indicated, these impurities comprise various organic acids, such as formic acid and acetic acid; lower aliphatic alcohols, especially methyl alcohol; various aldehydes such as acetaldehyde, furfural and furfural derivatives; and levulinic acid and levulinic acid derivatives. Various tarry materials also may be present. These materials may be removed selectively from the pentose and hexose liquors by extraction with a suitable organic solvent.

Preliminary to the solvent extraction it is desirable to neutralize partially the liquor, which has an original pH of from 1–2. This step has for its function the selective conversion of any inorganic acids to the corresponding salts while leaving in solution any free organic acids which may be present. The free organic acids then will be removed together with the non-acid organic impurities, during the solvent extraction step.

Hence the liquor is treated with caustic soda, soda ash, or other suitable basic material until a pH of 3–4 has been obtained. It then may be evaporated, preferably in vacuo, until its sugar concentration has reached a value of from 15–25% by weight.

In the alternative, and preferably, the liquor may be neutralized in one or two stages with a basic material which will form an insoluble precipitate with the inorganic acid present in the liquor. For example, when the acid is sulfuric acid, calcium or barium oxide, hydroxide or carbonate may be used as the neutralizing agent, together with a suitable filter aid. The resulting insoluble salt, e.g. calcium or barium sulfate, then may be separated by filtration and the resulting salt-free liquor evaporated to the desired concentration.

The partially neutralized and evaporated liquor is transferred to conventional extraction apparatus where it is contacted countercurrently in continuous flow, or batchwise, with a solvent having properties calculated to dissolve selectively the organic impurities, without dissolving the sugars, and without reacting with them. In addition, the solvent should be substantially water insoluble and chemically inert.

Classes of solvents which are suitable for the indicated purpose accordingly are the lower aliphatic ethers, chlorinated hydrocarbons and ketones, i.e. those aliphatic ethers, chlorinated hydrocarbons and ketones containing not more than 8 carbon atoms.

Illustrative of suitable lower aliphatic ethers are diethyl ether, methylpropyl ether, and di-isopropyl ether.

Illustrative of suitable lower alphatic chlorinated hydrocarbons are methylene chloride, chloroform, carbon tetrachloride and trichloroethylene.

Ilustrative of suitable lower aliphatic ketones are methylethyl ketone and methyl isobutyl ketone.

Contacting the liquor with the organic solvent results in the production of a two-phase system comprised of an aqueous phase containing the desired sugars and an organic solvent phase containing the organic solvent and impurities. These two phases are separated.

The aqueous phase, which contains the desired sugars is stripped with steam, or otherwise treated, to remove any residual solvent which may be in it. This removes from the sugars the materials which might affect adversely their subsequent application. It also results in the recovery of an additional quantity of solvent which may be cycled to solvent storage and reused in the treatment of a further quantity of liquor.

The organic liquid phase may be washed with water to remove the extracted impurities after which the water phase is stripped for removal of any residual solvent, the recovered solvent being passed to storage for reuse.

If desired the sugar solution may be treated with a further quantity of basic acting material such as caustic soda or soda ash until its pH has been raised to a value of 6–7. It then may be evaporated further, stored, or blended with yeast or other feed materials in the preparation of a livestock feed.

(D) APPLICATION OF FIRST STAGE HYDROLYSIS PRODUCT AS YEAST GROWTH SUBSTRATE

The yeast component of the feed may be generated from the pentose sugar liquor, produced in the first stage hydrolysis as described above, with or without first solvent-extracting the liquor for the removal of the yeast-growth-inhibiting impurities. The liquor is fortified with nutrient materials such as ammonium, potassium and phosphate salts. Sufficient water is added to produce the desired consistency.

The liquor then is inoculated with the selected yeast strain. This may be of any desired type, from a torula yeast to a cerevesiae yeast. Air is passed into the growth medium, and the fermentation gases are vented. The temperature is maintained at a level of about 15 to 40° C.

After completion of the yeast growth, the yeast is separated from the growth medium gravitationally, by centrifuging or by filtration. At this stage, it may have a solids content of from 10–25% by weight. The yeast then is killed by the application of heat to give a fluid yeast product which still is pumpable.

(E) STOCK FEED PREPARATION

The yeast product next is blended with the concentrated hexose sugar liquor previously prepared in the second stage hydrolysis, for example, using from 3 to 4 parts of sugar for each part of yeast, dry weight basis. Calculated amounts of trace growth elements also may be blended into the mixture if desired.

The resulting feed may have a water content of from 60 to 85% by weight and may be pumped directly to the livestock feeding station. In this way the necessity for drying the yeast, encountered in the production of dry feed mixtures, is completely eliminated. Also, the water requirements of the stock are largely met by water present in the moist feed. This overcomes a primary economic defect of the prior art procedures in which the yeast slurry was evaporated to near dryness to remove the water, after which, at a later date, the animals to which the yeast was fed were under the necessity of drinking sufficient water to supply their metabolic requirements. A costly evaporation step thus is eliminated.

The process of the invention is illustrated in the following example.

Example 1000 parts by weight of Douglas fir sawmill waste including largely sawdust and shavings was mixed in a double ribbon blender with 1800 parts of water.

The resulting mixture was passed into a continuous pressure reactor at an initial liquor to solids ratio of 1.6 to 1.

In the reactor the mixture was subjected to a pressure of 320 p.s.i.g. and a temperature of 220° C. for a dwell time of 7 minutes. During the reaction the pressure and temperature were attained and maintained by direct injection of steam. This resulted in increase of the liquor to solids ratio to a level of 3.9 to 1.

The material was transferred to a blowdown cyclone separator which lowered the pressure to atmospheric pressure in 1 minute. The steam fraction was treated for removal of volatile acetic acid and other volatile organics after which the liquid was recycled to the reactor.

The solid residue consisting of unhydrolyzed lignin, cellulose and absorbed sugars was transferred to a washer where it was passed countercurrent to dilute (0.79% by weight) sulfuric acid. This resulted in the displacement washing of the solids, leading to the separation of an aqueous pentosehexose sugar solution.

The solid fraction from the first stage extractor was dewatered and transferred to a second stage digester. Its initial liquor to solids ratio was 1.6 to 1. The mineral acid concentration was 0.79% by weight.

The pressure and temperature within the digester were raised to 590 p.s.i.g. and 252° C. respectively, by the direct injection of steam. This resulted in alteration of the liquor to solids ratio to a value of from 7.5 to 1.

The contents of the reactor were held at temperature and pressure for 1 minute. Thereafter they were transferred to a flash blowdown cyclone separator.

The steam from the separator was vented. The solid residue was passed to a countercurrent second stage washer where it was washed with water. The lignin slurry (600 parts) resulting from the washing was passed to waste.

12 parts of calcium carbonate was added together with ½ part of diatomaceous earth filter aid to the hexose sugar-containing solution. The resulting mixture was filtered and the resulting sulfate filter cake discarded.

The filtrate then was treated with 9 parts of barium carbonate and ½ part of filter aid. This mixture was filtered and the resulting sulfate filter cake thereafter discarded.

The filtrate was evaporated to a concentration of 12.8% in a vacuum evaporator after which it was solvent extracted with chloroform.

The sugar solution was passed countercurrent continuously to a quantity of chloroform in a continuous solvent extractor. The solvent phase containing the impurities was washed with water and recycled. The wash water was stripped with steam to remove solvent, which also was recycled.

The aqueous phase containing the sugars was stripped with steam, the strippings being processed for the recovery of the solvent.

The resulting solvent-extracted sugar solution contained 13% of hexoses, principally glucose.

The pentose sugar solution resulting from the first stage digestion was introduced into suitable fermenting apparatus where the sugar concentration was maintained at 0.1 to 0.3% by weight. Air and nutritional amounts of phosphoric acid, ammonia and potassium chloride also were supplied to the apparatus. The fermenting organism was torula utilis.

The temperature of the growth medium was maintained at 33° C. A stream of air was passed through it. The average residence time in the fermenter was about 4 hours.

The fermented liquor was withdrawn from the fermenter and centrifuged to a yeast solids content of approximately 25% by weight.

1 part by weight of the yeast fraction then was mixed with 2 parts by weight of the hexose sugar fraction and indicated quantities of vitamin supplements, amino acid, antibiotics, and trace minerals to form a fluid and complete livestock feed.

Having thus described the invention in preferred embodiments, what is claimed as new and desired to protect by Letters Patent is:

1. The process of converting lignocellulose material into stock feed which comprises:
   (a) preferentially hydrolyzing the hemicellulose content of the material in aqueous medium, thereby forming an aqueous pentose-containing liquor and a solid cellulose-and lignin-containing residue,
   (b) separating the pentose-containing liquor from the cellulose- and lignin-containing residue,
   (c) preferentially hydrolyzing the cellulose content of the residue in aqueous acid medium, thereby forming an aqueous hexose-containing liquor and a solid lignin-containing residue,
   (d) separating the hexose-containing liquor from the lignin-containing residue, thereby providing a hexose sugar stock feed material,
   (e) growing yeast in the pentose-containing liquor thereby converting its sugar content substantially to a yeast protein stock feed material, and
   (f) mixing the said hexose sugar and yeast protein stock feed materials in predetermined proportions, thereby providing a balanced stock feed derived substantially in its entirety from the lignocellulose starting material.

2. The process of claim 1 wherein the lignocellulose material is wood.

3. The process of claim 1 wherein the stock feed is pumpable and has a water content of 60 to 85% by weight.

4. The process of claim 1 wherein the aqueous pentose-containing liquor contains hydrolytic degradation products of the lignocellulose material, and including the steps of extracting the liquor with an organic solvent which is substantially insoluble in and chemically inert toward the liquor and in which the said hydrolytic degradation products selectively are soluble, followed by separating the extracted liquor product from the organic solvent.

5. The process of claim 1 wherein the pentose-containing liquor and hexose-containing liquor contain hydrolytic degradation products of the lignocellulose material, and including the steps of extracting each liquor individually with an organic solvent which is substantially insoluble in and chemically inert toward the liquor and in which the said hydrolytic degradation products selectively are soluble, followed by separating the extracted liquor product from the organic solvent.

6. The process of claim 1 wherein the hexose-containing liquor contains hydrolytic degradation products of the lignocellulose material, and including the steps of extracting the liquor with an organic solvent which is substantially insoluble in and chemically inert toward the liquor, and in which the said hydrolytic degradation products selectively are soluble, and separating the extracted liquor product from the organic solvent.

7. The process of claim 6 wherein the organic solvent comprises at least one member of the group of organic solvents consisting of the lower aliphatic ethers, clorinated hydrocarbons and ketones.

8. The process of claim 6 wherein the organic solvent comprises a lower aliphatic ether.

9. The process of claim 6 wherein the organic solvent comprises di-isopropyl ether.

10. The process of claim 6 wherein the organic solvent comprises a chlorinated hydrocarbon.

11. The process of claim 6 wherein the organic solvent comprises trichloroethylene.

12. The process of claim 6 wherein the organic solvent comprises chloroform.

13. The process of claim 6 wherein the organic solvent comprises a lower aliphatic ketone.

14. The process of claim 6 wherein the organic solvent comprises methyl ethyl ketone.

15. The process of claim 6 including the step of neutralizing the liquor product to a pH of from 3-4 preliminary to extraction of the liquor product with an organic solvent.

16. The process for the conversion of lignocellulose materials into stock feed which comprises:
 (a) heating the lignocellulose material in a first stage with a first aqueous treating agent,
 (b) using a treating agent to solids weight ratio within the range of from 1:1-5:1,
 (c) the treating agent having a mineral acid concentration of not over 0.3% by weight,
 (d) at a pressure of from 100-700 p.s.i.g. and corresponding temperatures for saturated steam,
 (e) for a time which is in substantially inverse relation to the temperature and which is sufficient to hydrolyze substantially selectively the hemicellulose content of the lignocellulose material, thereby forming a first solid residue containing predominantly unhydrolyzed lignin and cellulose and a first liquor product containing pentose sugars contaminated with hydrolytic degradation products of the lignocellulose material,
 (f) separating the first liquor product from the first solid residue,
 (g) extracting the first liquor product with an organic solvent which is substantially insoluble in and chemically inert toward the liquor and in which the said hydrolytic degradation products selectively are soluble,
 (h) heating the first solid residue in a second stage with a second aqueous mineral acid treating agent,
 (i) using a treating agent to solids ratio within the range of from 1:1-5:1,
 (j) the treating agent having a mineral acid concentration of from 0.3-3.0% by weight,
 (k) at a pressure of from 150-190 p.s.i.g. and corresponding temperatures for saturated steam,
 (l) for a time which is in substantially inverse relation to the temperature and which is sufficient to convert substantially selectively the cellulose content of the first solid residue to hexose sugars, thereby forming a second solid residue containing predominantly unhydrolyzed lignin and a second liquor product containing predominantly hexose sugars contaminated with hydrolytic degradation products of the lignin and cellulose,
 (m) separating the second liquor product from the second solid residue,
 (n) growing a selected strain of yeast in the first liquor product, thereby converting to a fluid yeast product a substantial proportion of its sugar content, and
 (o) combining the fluid yeast product with a predetermined proportion of the hexose-sugar-containing second liquor product, thereby producing a fluid stock feed containing both carbohydrate and protein constituents.

17. The process of claim 16 including the step of extracting the second liquor product with an organic solvent which is substantially insoluble in and chemically inert toward the liquor and in which the hydrolytic degradation products selectively are soluble.

18. The process for the conversion of lignocellulose material into stock feed which comprises:
 (a) heating the lignocellulose material in a first stage with a first aqueous treating agent,
 (b) using a treating agent to solids weight ratio within the range of from 1:1-5:1,
 (c) the treating agent having a mineral acid concentration of not over 0.3% by weight,
 (d) at a pressure of from 100-700 p.s.i.g. and corresponding temperatures for saturated steam,
 (e) for a time which is in substantially inverse relation to the temperature and which is sufficient to hydrolyze substantially selectively the hemicellulose content of the lignocellulose material, thereby forming a first liquor product containing pentose sugars and a first solid residue containing predominantly unhydrolyzed lignin and cellulose,
 (f) separating the first liquor product from the first solid residue,
 (g) heating the first solid residue in a second stage with an aqueous mineral acid treating agent,
 (h) using a treating agent to solids ratio within the range of from 1:1-5:1,
 (i) the treating agent having a mineral acid concentration of from 0.3-3.0% by weight,
 (j) at a pressure of from 150-900 p.s.i.g. and corresponding temperatures for saturated steam,
 (k) for a time which is in substantially inverse relation to the temperature and which is sufficient to convert substantially selectively the cellulose content of the first solid residue to hexose sugars, thereby forming a second solid residue containing predominantly unhydrolyzed lignin and a second liquor product containing predominantly hexose sugars contaminated with hydrolytic degradation products of the lignin and cellulose,
 (l) extracting the second liquor product with an organic solvent which is substantially insoluble in and chemically inert toward the liquor, and in which the said hydrolytic degradation products selectively are soluble,
 (m) separating the extracted second liquor product from the organic solvent,
 (n) growing a selected strain of yeast in the first liquor product, thereby converting to yeast a substantial proportion of its sugar content, and
 (p) combining the yeast product with a predetermined proportion of the hexose-sugar-containing second liquor product, thereby producing a fluid stock feed containing both carbohydrate and protein constituents.

References Cited by the Examiner

UNITED STATES PATENTS

| | | | |
|---|---|---|---|
| 2,442,804 | 6/1948 | Gaylor | 127—46 |
| 2,444,823 | 7/1948 | Hall et al. | 127—46 |
| 3,030,277 | 4/1962 | Thomsen | 127—37 |
| 3,212,932 | 10/1965 | Hess et al. | 99—2 |
| 3,212,933 | 10/1965 | Hess et al. | 99—2 |

FOREIGN PATENTS 21,708　1912　Great Britain.

OTHER REFERENCES

Nolte et al.: Feed Yeast and Industrial Alcohol, Ind. Eng. Chem., pp. 670–73, June 1942.

A. LOUIS MONACELL, *Primary Examiner.*

D. J. DONOVAN, *Assistant Examiner.*